Jan. 3, 1933. J. H. SMITH 1,892,739
TOOL AND TOOL HOLDER
Filed Dec. 13, 1928
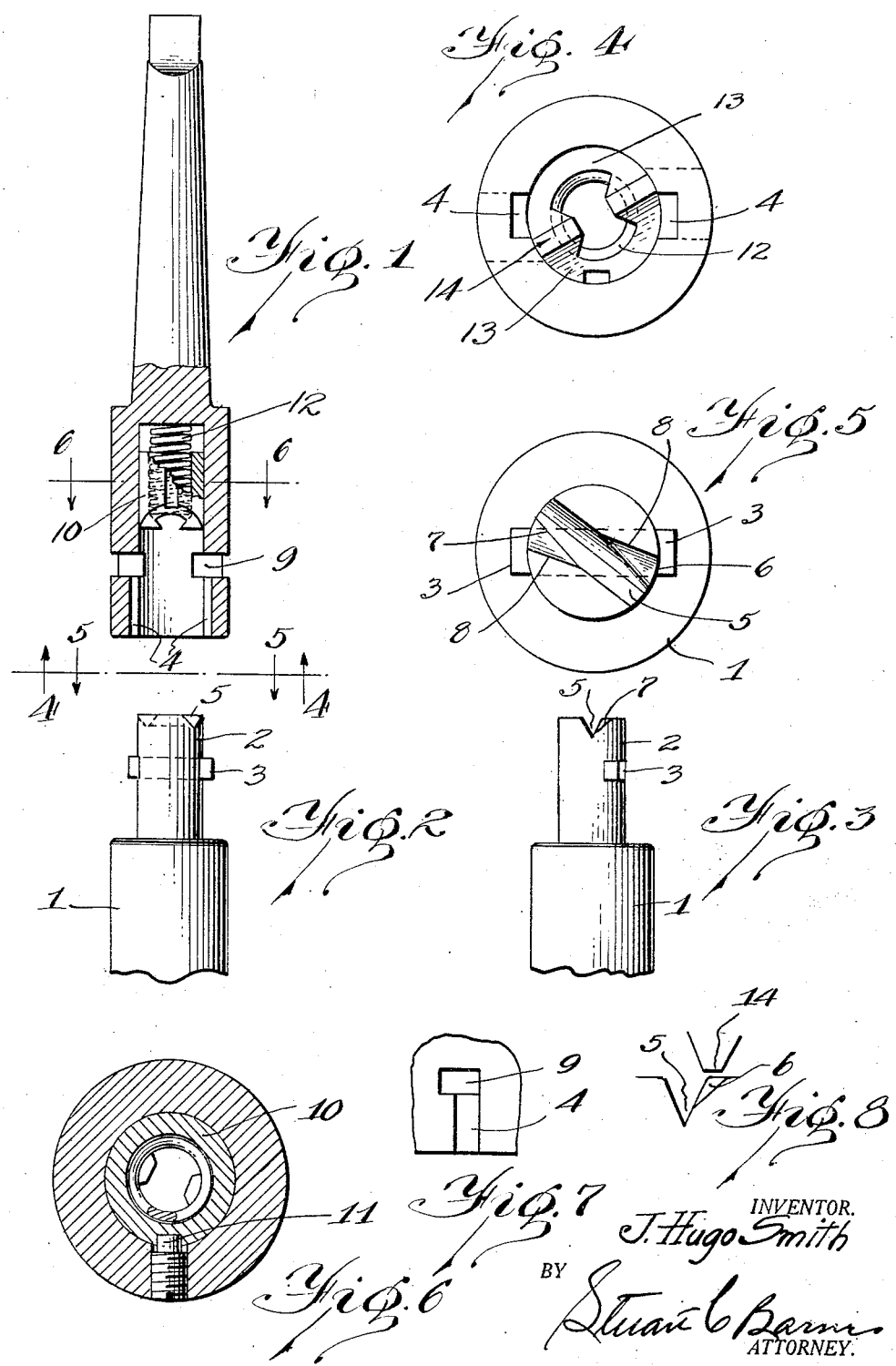
INVENTOR.
J. Hugo Smith
BY
Stuart C Barnes
ATTORNEY.

Patented Jan. 3, 1933

1,892,739

UNITED STATES PATENT OFFICE

J. HUGO SMITH, OF DETROIT, MICHIGAN

TOOL AND TOOL HOLDER

Application filed December 13, 1928. Serial No. 325,756.

This invention relates to a tool and tool holder, and has to do particularly with a novel arrangement of the interfitting parts of a tool and tool holder whereby to permit a quick, easy assembly and positive locking of the two parts.

Heretofore, it has been the standard practice to fabricate a tool with a tapered shank whereby the same is supported and held in an appropriate holder merely by the friction between the tapered shank and the sleeve of the holder. Other combinations of tools and tool holders have been designed in attempts to provide a more positive locking of the parts, but the majority of tools and tool holders of the prior art have presented the problem of either making it possible for the tool to drop out of its holder, or making it very difficult to insert and remove the tool from a positive locking position.

The present invention contemplates the provision of a tool and tool holder, the interfitting parts of which are so arranged and proportioned that the mere positive insertion of the tool within the holder will be sufficient to automatically twist and snap the tool into temporary locking position. This means for automatically snapping the tool into locking position also permits removal thereof by a slight twisting movement in one direction, whereby the tool will be immediately snapped out of locking position. With this structure, the tool will be positively held in operating position whereby there will be no possibility of the same falling out, and this automatic locking of the tool is obtained with the same simplicity and ease of movement as if the tool were merely moved into place.

More specifically, this novel tool and tool holder contemplates the provision of a tool shank having outwardly extending lugs in contrast to grooves, and a holder having grooves and a bayonet slot for receiving the lugs of the tool. A suitable spring pressed plunger is positioned within the holder and is adapted to contact with the end of the tool shank before the lugs of the tool shank engage the bayonet slots of the holder. The inner movement of the spring pressed plunger by the tool causes the tool to be positively and automatically twisted about its longitudinal axis whereby it will be snapped into place merely by reason of the longitudinal movement in moving the tool "home" into the tool holder socket.

In the drawing:

Fig. 1 is an elevation, partly in section, of one form of tool holder embodying the present invention.

Fig. 2 is a fragmentary elevation of a tool for insertion in the tool holder, showing particularly the manner of positioning and arranging the outwardly extending lugs on the shank of the tool.

Fig. 3 is a view similar to Fig. 2, viewing the tool from a different angle.

Fig. 4 is an enlarged plan view taken on line 4—4 of Fig. 1, illustrating the manner of positioning the apex of the spring pressed plunger at an angle to the diametrically positioned grooves for receiving the tool lugs.

Fig. 5 is an enlarged plan view of the tool taken on line 5—5 of Fig. 2, and showing particularly the transverse tapered groove in the top of the tool shank, together with the cam surfaces at opposite edges of said groove.

Fig. 6 is an enlarged sectional view taken on line 6—6 of Fig. 1, and illustrating the manner of guiding the spring pressed plunger in its longitudinal movement.

Fig. 7 is a fragmentary view of the inside wall of the holder showing the positioning of the bayonet slot at the end of the tool receiving groove.

Fig. 8 is a diagrammatic view illustrating the relative position of the tool holder groove and the apex of the plunger, just prior to contact between the two and twisting movement of the tool.

In illustrating the present invention, and particularly the tool holder, I have shown the same as embodied in a standard type of tool holder, but it will be readily understood that the particular design and type of holder is immaterial so far as the present invention is concerned, as long as the holder is adapted to receive a tool of the type described.

The tool itself may be generally designated 1 and instead of being grooved, tapered, or otherwise fabricated at its upper end, it is preferably turned down to provide a shank 2. Suitable diametrically positioned lugs 3 may be milled or otherwise formed in the shank whereby to engage and slide in suitable slots 4 which are also diametrically positioned in the tool holder.

The top of the tool shank 2 is provided with a diametrical notch 5, the side walls of which may be either tapered or slightly rounded. Opposite corners of this notch 5 are further tapered as at 6 and 7 to provide cam surfaces, as will be presently described.

The axis of the main notch 5 is preferably positioned at a predetermined angle with reference to the axis of the lugs 3, and the axis formed by the edges 8 of the cam surfaces 6 and 7 is also positioned at a predetermined angle with reference to the axis of the lugs 3.

The slots 4 of the tool holder are, of course, diametrically positioned in the inner walls of the cylindrical housing formed by the lower end of the holder, and terminate in suitable bayonet slots 9. Adapted to be longitudinally slidable within the hollow cylinder formed by the tool holder is a plunger 10 which is guided in its longitudinal movement by means of a pin 11 cooperating with a suitable longitudinal slot in the outer wall of the plunger. The plunger 10 is preferably hollow to receive a coil spring 12, as best shown in Fig. 1, and the working end of the plunger is preferably tapered as at 13 whereby it terminates in an apex which may be generally designated 14.

By reason of the longitudinal guiding of the plunger by the pin 11, it will be obvious that the angle between the apex 14 and the axis of the slots 4 may be predetermined, and the angle between such apex and slots is such as to substantially correspond with the angle formed by the edges 8 of the cam surfaces 6 and 7. In other words, when the tool shank is inserted in the tool holder the angle of the apex 14 is such that contact will first be made between the tapered walls immediately adjacent the apex and the cam surfaces 6 and 7 at the corners of the notch 5.

This operation is best illustrated in Fig. 8. As the shank of the tool is moved inwardly into the tool holder, the upper edges of the cam surfaces 6 and 7 will first contact with the apex of the plunger 10 and as the lugs 3 will still be positioned in the slots 4 it will be obvious that the plunger must be pressed inwardly. As the plunger is pressed inwardly, tension, of course, will be placed on the tool shank by reason of the apex of the plunger and the cam surfaces 6 and 7 so that as the lugs 3 reach a position in alignment with the bayonet slots 9, it will be obvious that a decided twisting movement will be given to the tool, whereby the lugs will be positively moved into the recesses formed by the bayonet slots 9. This action is completely automatic and may be termed simultaneous with the moving of the tool into the tool holder. In other words, all that is necessary to positively position and lock the tool in the tool holder is to place the tool shank in the tool holder and move it towards its "home" or seated position. The same continuous movement in the moving of the tool towards its seated position will also automatically cause it to be snapped into locking position as the spring action upon the plunger need be very slight.

Movement of the tool holder in one direction will, of course, serve to operate the tool to perform the work assigned to it. If it is desired to release the tool from the tool holder it is only necessary to twist the same in the same direction to which the tool holder normally rotates, whereby it will immediately and very easily snap out of locking position, as the twisting movement of the tool will push the plunger inwardly whereby the tool will be given a positive outward acceleration when it is moved far enough so that the lugs are in alignment with the slots 4.

It will be obvious from Figs. 1 and 7 that the bayonet slots 9 are formed by cutting entirely through the wall of the holder, with the result that it is thereby possible to provide an absolutely square shoulder relative to the longitudinal axis of the tool holder. It will be obvious that if the bayonet slots were merely formed from the inside that the same degree of accuracy could not be obtained, or at least not without considerable difficulty.

It will also be understood that the cam surfaces formed by the apex of the plunger 10 and the top of the tool may be reversed, the important point being that means should be provided tending to give the tool a positive torsional or twisting movement whereby it will be twisted into locking position the moment the lugs of the tool reach the bayonet slots.

What I claim is:

1. A tool and holder therefor, comprising cooperating elements forming a part of each whereby they may be moved relatively in longitudinal alignment, an opening formed in the holder and extending entirely through the wall thereof to form a square shoulder to receive one of the cooperating elements of the tool in locking position, and means for automatically giving one of said members a relative twisting movement during their relative longitudinal movement and when said cooperating elements of the tool reach the opening in the holder.

2. A tool and holder therefor, comprising cooperating elements forming a part of each whereby the tool may be longitudinally moved inwardly in axial alignment with the holder, means to permit relative rotation of the tool and holder and to secure the tool against longitudinal movement when rotated, a spring pressed plunger longitudinally movable in axial alignment with the holder, cooperating surfaces on said tool and plunger tending to twist the tool about its axis, and means for preventing such twisting action during the initial movement of the tool into the holder, and cooperating surfaces for restraining the tool after twisting movement, said two sets of cooperating surfaces acting to first positively and automatically twist the tool toward locking position and then upon further movement lock the tool into the holder.

3. A tool and holder therefor, comprising cooperating elements forming a part of each whereby the tool may be longitudinally moved inwardly in axial alignment with the holder, a spring pressed plunger longitudinally movable in axial alignment with the holder and terminating in an apex, a notch formed in the end of the tool, the axis of said apex and said notch being out of alignment during longitudinal movement of the tool within the holder, and cam surfaces formed at opposite edges of said notch and contacting with said apex whereby to positively twist the tool and bring said apex and notch in alignment whereby to lock the tool in twisted position.

4. A tool and holder therefor, comprising cooperating elements forming a part of each whereby the tool may be longitudinally moved inwardly in axial alignment with the holder, one of said elements having sloping parallel sides terminating in an apex and the other of said elements being provided with a notch, said apex and said notch being normally positioned so that they are out of alignment when the tool is inserted in the holder, and cam surfaces at opposite edges of said notch for engaging the edges of said apex and tending to twist the same into alignment with the axis of said notch.

5. The combination of a tool and member for receiving and holding the same in work operating position, comprising a tool provided with lugs for engagement with similarly positioned slots in said member, bayonet slots positioned in the walls of said member at a predetermined distance from the end thereof, a resilient plunger in said member having an apex, said tool being guided longitudinally to depress the plunger until said lugs reach a position adjacent said bayonet slots, said tool having a cam surface shaped to cooperate with the apex of said plunger to give said tool a positive twisting movement simultaneously with the movement of the lugs to a position where they cooperate with said bayonet slots.

6. The combination of a tool and member for receiving and holding the same in work operating position, comprising a tool provided with lugs for engagement with similarly positioned slots in said member, bayonet slots positioned in the walls of said member at a predetermined distance from the end thereof, a resilient plunger in said member having an apex, said tool being guided longitudinally to depress the plunger until said lugs reach a position adjacent said bayonet slots, said tool having a cam surface shaped to cooperate with the apex of said plunger to give said tool a positive twisting movement simultaneously with the movement of the lugs to a position where they cooperate with said bayonet slots, and a notch formed at the base of said cam surface for cooperation with said apex to lock the tool in twisted position.

7. A tool and holder therefor, comprising cooperating elements forming a part of each whereby the tool may be longitudinally moved inwardly in axial alignment with the holder, a lug on the said tool adapted to cooperate with a longitudinal slot in the holder to prevent rotation of the tool during part of the longitudinal movement of the said tool, a resilient plunger having an apex, positioned in the holder, the said tool having a cam surface, the said apex and the said cam surface cooperating to cause the tool to tend to positively turn about its axis during a greater part of said longitudinal non-rotatable movement.

8. A combination of a tool and member for receiving and holding the same in work operating position, comprising a tool provided with a lug for engagement with a slot in said member and having a cam surface, a retaining depression formed in the wall at the end of said slot and a resilient plunger having an apex positioned in the said holder, the said apex cooperating with said cam surface to effect a torsional pressure against said tool while said lug is still in engagement with said slot whereby said tool will be automatically turned when said lug is in position to enter the retaining depression at the end of said slot.

In testimony whereof I affix my signature.

J. HUGO SMITH.